United States Patent [19]

Sinko et al.

[11] 4,187,981
[45] Feb. 12, 1980

[54] CODED MODULE FOR USE IN A MAGNETIC PULSE GENERATOR AND METHOD OF MANUFACTURE

[75] Inventors: Michael J. Sinko, Guilford, Conn.; Milton Velinsky, Atlantic Highlands, N.J.

[73] Assignee: The Echlin Manufacturing Company, Branford, Conn.

[21] Appl. No.: 965,023

[22] Filed: Nov. 30, 1978

[51] Int. Cl.² ............... G06K 19/04; G06K 7/08; G11C 11/02
[52] U.S. Cl. ................... 235/488; 235/449; 235/493; 365/59; 235/489
[58] Field of Search ............ 235/449, 450, 488, 493; 365/59

[56] References Cited

U.S. PATENT DOCUMENTS

| | | | |
|---|---|---|---|
| 3,783,249 | 1/1974 | Wiegand | 235/493 |
| 3,808,404 | 4/1974 | Riggs | 235/493 |
| 3,859,508 | 1/1975 | Brosow et al. | 235/493 |

*Primary Examiner*—Daryl W. Cook
*Attorney, Agent, or Firm*—McAulay, Fields, Fisher & Goldstein

[57] ABSTRACT

A coded, magnetic module has a plurality of Wiegand effect exhibiting wires deployed parallel to one another and extending substantially across the module. These wires are supported in a laminated arrangement between two thin plastic support plies. Coding is impressed on the module by punching out an intermediate portion of each wire including the adjacent zone of the support plies. This produces a relatively physically stable coded module for subsequent use as part of a coded magnetic pulse generator.

9 Claims, 10 Drawing Figures

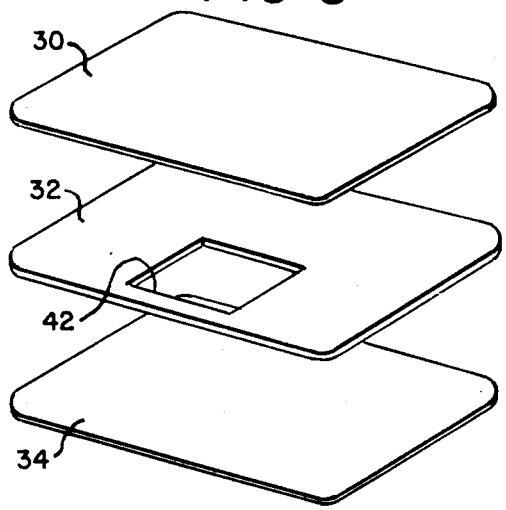
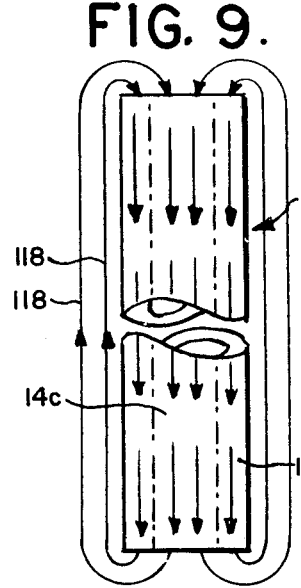
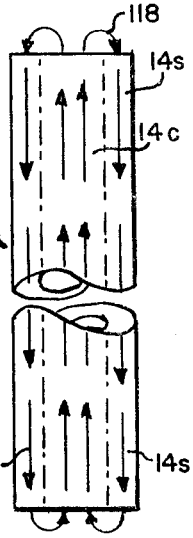
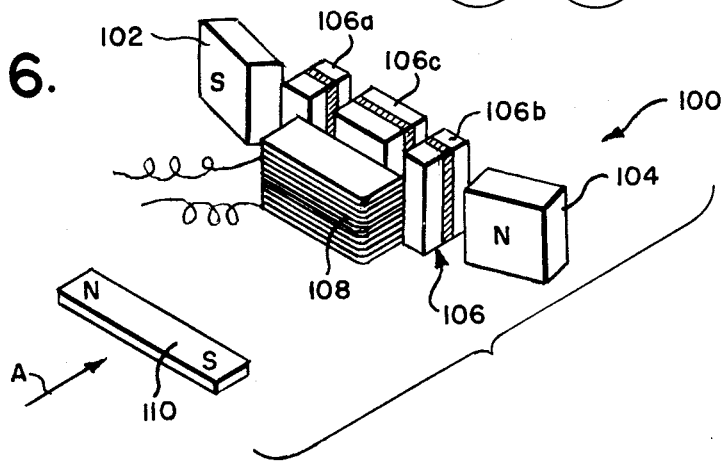
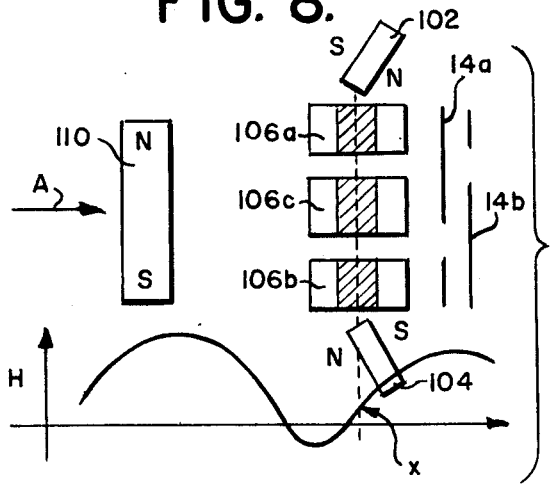
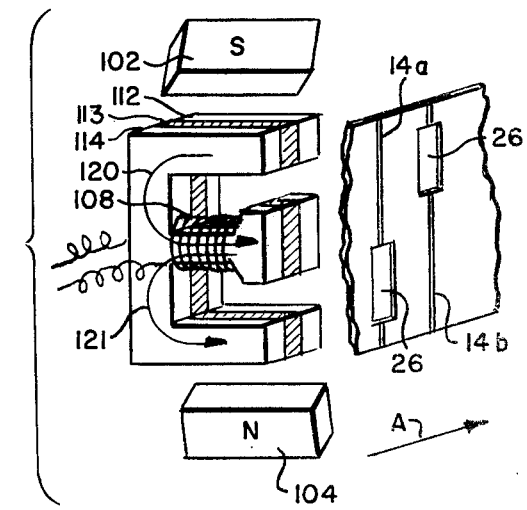

CODED MODULE FOR USE IN A MAGNETIC PULSE GENERATOR AND METHOD OF MANUFACTURE

REFERENCE TO RELATED APPLICATION

The preferred magnetic wire employed in the module of this invention is described in co-pending application Ser. No. 897,483 filed on Apr. 18, 1978 in the name of John R. Wiegand. The application is entitled Switchable Magnetic Device And Method Of Manufacturing Same. The disclosure of this co-pending application is incorporated herein by reference.

BACKGROUND OF THE INVENTION

This invention relates in general to a module that can be used as an actuating element for a pulse generator and more particularly to a module that can be used in an identification card such as a credit and/or access card.

Identification cards of a number of different types have been proposed and employed. One of the more commonly used identification cards incorporates a magnetic stripe that carries a coded signal. Although the magnetic stripe is easy to code, the code can easily be altered. This is a major reason why these magnetic stripe encoded cards provide limited security.

Accordingly, the use of the magnetic stripe encoded device on such documents as a passport, identification papers or an identification card is generally unacceptable because of the ease with which the code can be changed.

In addition, the code can be destroyed by accident when the magnetic stripe is brought within the influence of a strong magnetic field.

Furthermore, the magnetic stripe must be in contact with, or at least in very close proximity to, the readhead in order for its code to be scanned. This requires a precision reader and also requires that the stripe be on the outside of the card, or substantially on the surface of the card, where it may be subject to physical degradation and abrasion. In addition, the proximity required between readhead and magnetic stripe for scanning and the close tolerances required make it extremely difficult and, as a practical matter, generally impossible to use the magnetic stripe for encoding on moving conveyors or the like. Yet, it is useful to have some sort of a coding scheme associated with a moving conveyor so as to keep track of items being conveyed. It is difficult to control the conveyor so that a piece of magnetic stripe carried on the conveyor can be moved into contact with the readhead. Such practical problems all but rule out any use of the magnetic stripe devices on conveyors or on other moving structures.

Accordingly, it is a major purpose of this invention to provide an encodable module that can be used to encode a wide variety of items, including an identification card, and in which the code cannot be changed.

It is a further important purpose of this invention to provide such a codable module as can be read by a readout mechanism without requiring contact or very close tolerances between the readout device and the encoded module.

It is further important, and is an object herein, that the coded module be capable of being repeatedly and reliably read. It is important that variations in operating conditions, the accumulation of dirt, variations in temperature and humidity, not affect the reliability and repeatability with which the code can be accurately read out.

It is a further object of this invention to provide an encodable module which can be simply coded and which does not require a particularly complex encoding procedure so that the module can be used in a large volume situation such as for a bank identification card or charge card.

In order to achieve a wide variety of applications and high volume use, it is important and therefore an object herein, that the module involved be easily and inexpensively manufactured.

For purposes of maintaining security, it may be desirable to separate the manufacture of the encodable module from the actual encoding of the module. Accordingly, it is a further object of this invention to provide an encodable module which can be encoded at a separate time and a separate place from the time and place of its manufacture.

BRIEF DESCRIPTION

The Wire Employed

One embodiment of this invention employs a plurality of bi-stable magnetic wires exhibiting the Wiegand effect. Wires exhibiting this effect are disclosed and claimed in U.S. Pat. No. 3,820,090, issued June 25, 1974, and U.S. Pat. No. 3,892,118, issued July 1, 1975, in both of which John R. Wiegand is the inventor. A presently preferred form of this wire is disclosed in pending patent application, Ser. No. 897,483, filed on Apr. 18, 1978, in the name of John R. Wiegand.

An understanding of the wire is necessary to an understanding of this module. To avoid repeating the teachings of the above patents and application, all that need be stated here is that short segments (e.g. one centimeter) of a ferromagnetic material in the form of a wire (e.g. one-quarter millimeter in diameter) can be treated to operate as a magnetic switch. When in a first state, the flux generated by the wire completes a path outside the wire. When the wire is in a second state, the flux completes a path within the wire. The change in flux can be sensed by an appropriately placed pick-up coil. Because the switching between states occurs very fast, the induced voltage in the pickup coil is substantial (e.g. one volt) and thus provides a readily usable signal.

The Module

In brief, the module incorporates a plurality of relatively short segments of these wires deployed parallel to one another and in alignment much like the rungs of a step ladder. However, they are held in position by being laminated between two thin plastic strips to form a strip-like module. The width of the strip-like module is approximately equal to the length of the wires. The length of the strip, and therefore the number of wires carried thereon, is determined by the number of bits desired in the code.

The module is encoded by punching holes in it. Each hole is punched so as to remove a portion of one of the wires. If the strip is viewed so that the wires are visualized as the rungs of a ladder, then each wire can be considered to have a right hand half and a left hand half. The punched out portion is either in the left hand half or in the right hand half. From the point of view of a binary code, if the hole is punched in the right hand half of the wire, then that wire can be considered to represent a "one" bit and if the hole is punched in the left hand half of the wire, then that wire can be considered to be a "zero" bit. The amount of the wire punched out is not the full half involved, but is only a portion of the half involved so that, for each wire, a small outboard segment of the wire remains. In this fashion, the edges of the module strip are not cut and thus the module retains its perimeter and will retain its shape during handling making it relatively easy to handle the encoded strip.

The module is incorporated in an appropriate carrier device such as an identification card. The coded module is read by passing it under a read head. The read head includes a setting magnet which causes the wires to be magnetically polarized in the same direction. After each wire has been properly polarized, it passes to a portion of the read head where the field has a magnitude and direction that causes the wire to switch its state. Upon the switch in state, a flux reversal occurs that is sensed by a pick-up coil that provides an output pulse.

When a one bit wire switches state, the flux change through the readhead and the pick-up coil is in a first direction causing an output pulse of a first polarity. When a zero bit switches state, the flux change through the readhead and the pick-up coil is in a second direction causing an output pulse of a second polarity. Thus the polarity sequence of the output pulses can be read, thereby reading the code.

BRIEF DESCRIPTION OF THE DRAWINGS

FIG. 5 is an exploded view of the three plies of the material used to fabricate the FIG. 3 credit card. FIG. 5 illustrates the opening in the central ply to accept the FIG. 2 module.

FIG. 6 is a perspective view of the various active elements of a suitable read head for use with the FIG. 2 module, with all support structure removed for clarity;

FIG. 7 is a diagrammatic view in perspective of the FIG. 6 read head showing the relationship of the module being read to the read head and illustrating alternate flux path direction through the pick-up coil on the center leg of the read head.

FIG. 8 is a magnetic schematic plan view along the face of the read head illustrating the various polarities that are adjacent to each wire as the wire passes over the face of the read head. FIG. 8 includes an idealized curve illustrating the field strength and polarity along the face of the read head in the direction of travel of the wire across the read head.

FIGS. 9 and 10 are schematic illustrations of the Wiegand effect exhibiting wire illustrating the flux arrangement when in the confluent state where core and shell magnetization are in the same direction and when in the reverse state where core and shell magnetization are in the opposite directions.

DESCRIPTION OF THE PREFERRED EMBODIMENT

Figure 1:
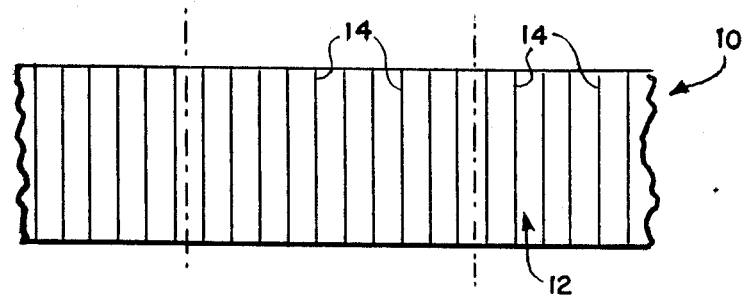
FIG. 1 is a plan view of a laminated strip of support material carrying Wiegand effect exhibiting wires secured between the laminations.

FIG. 1 shows a strip 10 of module structure composed of a support 12 and a plurality of Wiegand effect exhibiting wires 14. The wires 14 are secured to the support 12, preferably by being laminated between a first support ply 16 and a second support ply 18, as shown in FIG. 2.

Figure 2:
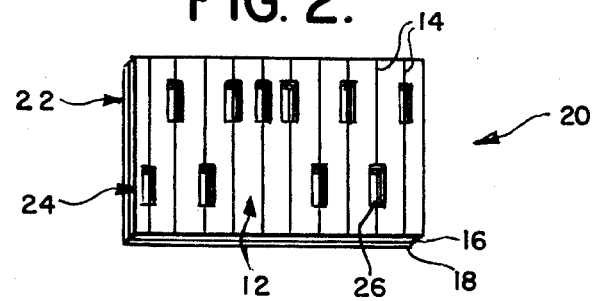
FIG. 2 is a module cut from the FIG. 1 strip with a predetermined code obtained by punching out portions of the wire, including the associated support laminate.

The module 20 shown in FIG. 2 is cut from the strip 10 of module structure shown in FIG. 1. The module 20 may be considered having an upper half 22 and a lower half 24. Coding is accomplished by punching holes, such as the rectangular holes 26, from the module material to remove either an upper or a lower portion of the Wiegand effect exhibiting wires 14. If the module 20 is to be encoded by the ultimate user, the holes 26 are not prepunched.

Figure 3:
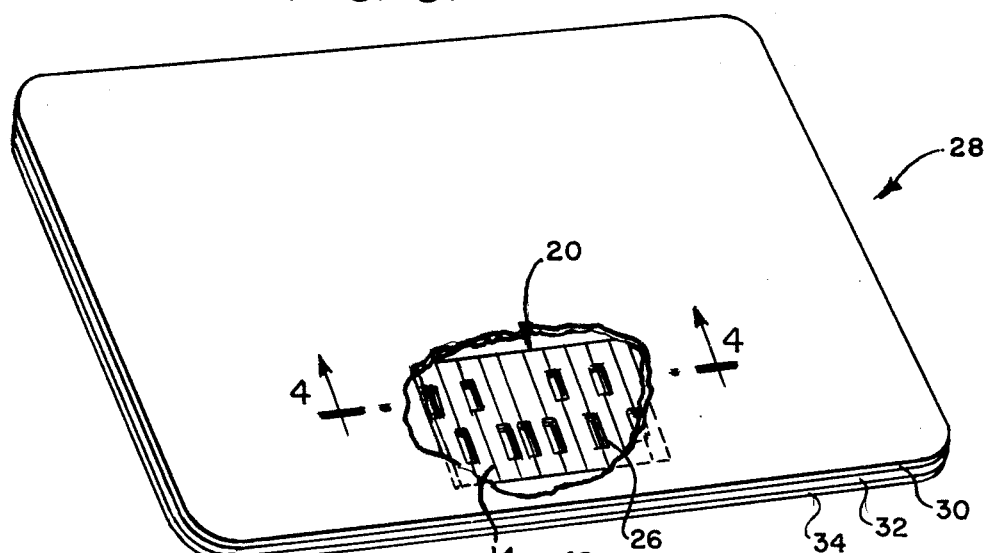
FIG. 3 is a coded magnetic pulse generator of the credit card type, with a portion of the top layer broken away to show the FIG. 2 coded module embedded therein.

FIG. 3 illustrates a card 28 which may be a credit card, identity card or other kind of access card. The FIG. 3 card 28 incorporates the FIG. 2 module 20. The card 28 has a top ply 30, a center ply 32, and a back ply 34. A portion of the top ply 30 is shown broken away to illustrate the presence of the module 20. It should be noted that in the actual embodiment, the plies 16 and 18 that constitute the support plies of the module 20 are made from the same plastic material as are the plies 30, 32, and 34 of the card 28. Thus after the laminating process on the card 28 has been completed, the separate structural existence of the module ply 16 and 18 is no longer evident. The module plies 16 and 18 function to provide the intermediate product, i.e. the module 20 as shown in FIG. 2, in a format that facilitates incorporation in the end product, i.e. the card 28.

The types of material typically employed for the module 20 include polyvinlychloride, nylon and Mylar.

Figure 4:
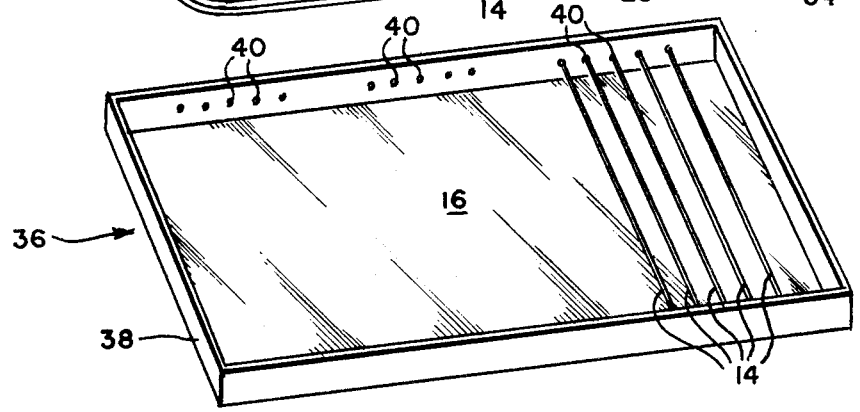
FIG. 4 is a diagrammatic perspective view of a laminating press die for making the FIG. 1 strip.

One mode of forming the module 20 that has been successful employs a die or frame 36 which is diagramatically shown in FIG. 4. A steel box 38 has four sidewalls and a basewall. The material that forms the first ply 16 of the module 20 is laid down at the bottom of the box 38. This material may be a one-quarter of a millimeter (0.010 inch) thick plastic sheet. The wires 14 are then inserted through holes 40 which are aligned across opposed sidewalls of the box 38. These Wiegand effect exhibiting wires 14 are clamped in place by any convenient means (said means not being shown herein). Then the material that forms the second ply 18 is laid on top. This second ply 18 material is of the same composition and thickness as is the first ply 16 material. A steel cover (not shown) is fitted on top of the assembly and the assembly is inserted into a laminating press (also not shown).

The laminating cycle depends on the type of material used but it is usually about 45 minutes and is at a temperature of about 200° C. (400° F.). The resulting sheet of laminate is about 0.37 mm (0.015 inches) thick due to the squeezing down effect of the laminating process. The resulting sheet of laminate is cut into strips 10 of module structure as shown in FIG. 1 and thereafter, these strips 10 are cut into the modules 20 as required.

The card 28 is laminated from the three plies 30, 32, and 34 under similar conditions of temperature and pressure. As shown in FIG. 5, the three plies 30, 32, and 34 which are laminated to provide the card 28, include an opening 42 in the center ply 32. This opening 42 is sized to receive the module 20. The encoded module 20 is inserted into the opening 42 prior to the lamination process that forms the card 28.

The Readhead

FIGS. 6, 7, and 8 illustrate the readhead 100 which has been found particularly useful in reading the coded module 20. An understanding of the operation of the readhead 100 will aid the user to optimize the dimensions of a particular readhead for a particular application. Furthermore, an understanding of the operation of the readhead 100 facilitates understanding the manner in which the module 20 is effective to provide the encoded information.

The readhead 100 has first and second magnets 102 and 104, a laminated E-shaped core 106 and a pick-up coil 108 that is wrapped around the center leg 106c of the laminated E-shaped core 106. In addition, a setting magnet 110 spaced from the readhead 100 serves the function of assuring that each coded wire 14 is set to the same polarity before it is subjected to the field under the readhead 100.

In FIGS. 6, 7, and 8, the arrow marked "A" illustrates the direction of travel of the module 20 and thus the direction of travel of each of the coded wires 14 across the face of the readhead 100. Each wire first passes under the setting magnet 110 thereby assuring that each wire has the same polarity. The wire then passes under the face of the E-shaped core 106 at which time the wire switches state inducing a pulse in the pickup coil 108.

Before analyzing what happens under the face of the core 106, it should be noted that the core 106 is composed of three E-shaped laminae 112, 113 and 114. The outer laminae 112 and 114 are a soft magnetic material such as soft iron that is readily magnetized in the presence of the magnets 102 and 104. The center lamina 113 is magnetically inert and thus may be plastic or aluminium. The two magnets 102 and 104 generate the field which causes the wire 14 to switch state. However, the configuration of this field is determined by the polarity and angling of these two magnets 102 and 104 as well as by the existence and configuration of the E-shaped core 106. The result is that the magnetic field seen by the wire 14 as it travels across the setting magnet 110 and readhead 100 has approximately the configuration shown in FIG. 8.

The FIG. 8 illustration is not to scale. It is an idealized illustration of the field polarity and strength along the "A" direction. FIG. 8 shows a field having the asymmetric polarity and magnitude necessary to cause the wires 14 to switch state at a location at the center axis of the face of the E-core 106. It is desirable to switch the wires 14 at the center axis of the core 106 in order to assure that a maximum amount of the flux generated by the wire 14 is coupled through the pick-up coil 108 when the wire 14 switches state.

When the wire 14 does switch state, the amount of flux coupled through the center leg 106c of the core changes and this change in flux is sensed by the pickup coil 108 to provide an output pulse.

The wire 14 has two magnetic states as illustrated in FIGS. 9 and 10. The manner in which the wire 14 is manufactured as well as a discussion of the nature of these two states may be found in the application Ser. No. 897,483 referred to above supplemented by U.S. Pat. No. 3,820,090 issued June 25, 1974 to John R. Wiegand. The preferred form of the wire 14 for use in this module 20 is disclosed in the patent application. The magnetic field configuration shown in FIG. 8 and the following description assume that preferred wire.

Suffice it to say for present purposes that when the wire 14 is subjected to the field from the setting magnet 110 it is magnetized and set into the state indicated in FIG. 9. In this state, the entire wire segment 14 is magnetized in a single direction and this state is conveniently termed the confluent state.

As the wire 14 travels to the right in FIG. 8 and leaves the influence of the magnet 110, it maintains the confluent state set by the magnet 110. However, as the field goes slightly negative near the readhead 100, the wire 14 will switch into its reverse state (the state shown in FIG. 10). In this reverse state, a relatively magnetically hard shell portion 14s of the wire captures and reverses the polarity of the relatively magnetically soft core portion 14c. Accordingly, the flux 118 generated by the relatively hard shell portion 14s is coupled through the relatively soft core portion 14c and the flux pattern changes from that shown in FIG. 9 to that shown in FIG. 10. A discussion of the relatively hard shell portion 14s and the magnetically soft core portion 14c may be found in the referenced patent application and referenced patent.

As the wire continues to move under the readhead 100, the slightly negative field becomes positive and at a point approximately along the central axis of the readhead 100, the field becomes sufficiently positive so as to cause the wire 14 to switch back into its confluent state (the state shown in FIG. 9). This change in the magnetic state of the wire causes the flux 118 generated by the shell portion 14s that was coupled through the core 14c to complete its path outside of the wire 14. Because of the presence of the soft iron and therefore low reluctance paths through the outer laminae 112 and 114 of the E-core 106, this flux 118 will be coupled through the E-core 106.

The wire segments 14 that constitute the code in the module and card can be arbitrarily considered as being composed of upper wire segments 14a and lower wire segments 14b. This reference to upper and lower is simply to provide convenient correspondence to the way in which they are shown in the FIGURES. As the card 28 is passed under the readhead, the upper segments 14a span the gap between the upper leg 106a and the center leg 106c. The lower segments 14b span the gap between the lower leg 106b and the center leg 106c. When an upper wire segment 14a switches from its reverse state (FIG. 10) to its confluent state (FIG. 9), then the flux 118 will complete a path through the upper leg 106a and the center leg 106c in the direction shown by the curved arrow line 120. Accordingly, the change in flux through the pickup coil 108 will be in a first direction and will induce an output pulse of a first polarity. When the lower wire segment 14b switches from its reverse state to its confluent state under the readhead 100, then the flux will complete a path through the lower leg 106b and the center leg 106c in the direction shown by the curved arrow line 121. In this case, the change in flux 118 through the pickup coil 108 will be in a second direction opposite from the first direction and thus will induce an output pulse of a second polarity.

In this fashion, each upper wire segment 14a will produce an output pulse of a first polarity and each lower wire segment 14b will produce an output pulse of a second polarity thereby providing the desired coding and decoding of the card 28.

As indicated in the referenced application and referenced patent, the change in state of the wire 14 is very rapid. When employing the preferred embodiment of the wire disclosed in the referenced patent application, this change of state is particularly rapid when switching from the reverse state (FIG. 10) to the confluent state (FIG. 9). Thus the rate of change of flux with time is very great. As a consequence the output pulse is appreciable and can be readily read by downstream electronic equipment to provide the desired reading of the card 28 that is passed over the face of the readhead 100.

It has been found preferable to use the particular Wiegand effect exhibiting wire which is disclosed in the referenced application Ser. No. 897,483. In general, the Wiegand effect exhibiting wire disclosed therein is a vanadium-cobalt-iron wire which has been processed in a fashion disclosed in the application. This particular wire has been found to give a large pulse when switched from its reverse state to its confluent state after being subjected to an asymmetric field of the type shown in FIG. 8.

It has been found that Wiegand effect exhibiting wires in general have optimum lengths for maximum pulse strength, depending on the nature of the wires and their work hardening history. There are usually a number of multiples of a basic length which result in high output available when switched. For optimum output in any size range, there will be an optimum length of the wire 14 which remains as the longer piece of wire left in the module after it has been punched (coded). The wire segments 14a and 14b should span the face of an outer leg 106a or 106b and the face of the center leg 106c. The size of the hole 26 need only be sufficient to provide a small gap. The remaining small piece of wire between the hole 26 and the end of the module does not appreciably affect the output of the pick-up head. This appears to be due to two factors. First, because the piece of wire is so short, any flux change due to switching the wire is small and has little effect on the output of the pickup coil 106. Second, it has been observed that shorter pieces of Wiegand effect exhibiting wire are switched at a different magnetic field magnitude. It is assumed that this causes any switching which takes place in the small piece of wire to occur at a different point in the movement of the wire through the readhead, and therefore at a less than optimum point for "pick-up" of its pulse. Thus, not only is the pulse of relatively small magnitude, but it also normally occurs at other than an optimum position with respect to the readhead and therefore its effect is greatly minimized or eliminated altogether.

Of course, the punched portion could well be greater than shown so as to eliminate the small segment (or tail) entirely. However, that would produce a module having edge openings and thus a module physical configuration that would be difficult to physically handle. Thus the embodiment disclosed includes the tail segment to assure a physically stable module. It should also be noted that the broad notion of the use of foreshortened Wiegand effect exhibiting wires for encoding a credit card is disclosed in John Wiegand's U.S. Pat. Nos. 3,774,178 and 3,774,180 issued in November of 1973.

The following is an example of one module which is suitable for the type of magnetic pulse generator illustrated in FIG. 3. The specific dimensions of this example are the result of the particular Wiegand effect exhibiting wire and the constraints of the type of device in which the module is to be used.

Wiegand effect exhibiting wire was utilized to form a sheet. The sheet was cut into strips 10 approximately 14 millimeters wide. Encoding was accomplished by punching rectangular holes 20 with dimensions of about 1.5 millimeters by 3.2 millimeters; the center of the holes 20 being about 3.6 millimeters from either the upper or lower edge of the strip.

The result of this encoding is an active piece of wire 14a, 14b, having a length of about 8.8 millimeters, and an inactive "tail" piece of about 2 millimeters.

When cut into modules 20, the result is a physically stable module because the periphery thereof has remained undisturbed, although central portions have been removed. The approximate dimensions for a readhead 100 for use with such a module are that the total width of the readhead should be about the same as the total width of the module 20, that is a span of about 14 millimeters. The distance across the center leg 106c of the readhead to the outer edge of either end leg should be about the length of the active piece of wire 14a, 14b; that is, about 9 millimeters. Although the spacing between the readhead and the setting magnet 110 may be varied somewhat, depending on the strength of the setting magnet, generally about 38 millimeters is sufficient with most magnets 110 which are in size of the same order of magnitude as the size of the readhead. The magnets 102 and 104 have a tilt of about 15 or 20 degrees to the plane of the lamina 113. This angle may be varied considerably and still result in a readhead which will operate satisfactorily.

Outputs of greater than one volt have been obtained using this arrangement.

What is claimed is:

1. A module for use in a coded magnetically induced pulse generator comprising:
    a support sheet, and
    a set of bi-stable magnetic wires disposed in generally parallel and spaced apart relationship to one another, said wires being supported on said sheet, each of said wires when magnetized having first and second magnetic states and being switchable between said states in response to an external magnetic field passing through first and second threshold values respectively,
    a portion of each of said wires being removed, a first subset of said wires having said portion removed near a first end thereof thereby providing a first bit in a binary code and a second subset of said wires having said portion removed near a second end thereof thereby providing a second bit in a binary code,
    said removed portion of each of said wires being spaced inboard from the end of each associated wire thereby leaving a small segment of said wire outboard of the removed portion to provide a degree of physical integrity for the module.

2. The module of claim 1 wherein the inboard portion of each of said wires overlaps a central axis of said module.

3. The module of claims 1 or 2 wherein the first ends of each of said wires are aligned and the second ends of each of said wires are aligned.

4. The module of claims 1 or 2 wherein said support sheet is removed adjacent the zone of said removed portion of said wires.

5. The module of claims 1 or 2 wherein said support sheet comprises: first and second plies, said wire being sealed between said plies.

6. The method of manufacturing a coded magnetic module for use in a pulse generator comprising the steps of:

affixing a plurality of spaced apart, substantially parallel, bi-stable magnetic wires to a support sheet, removing an effective predetermined portion of each of said wires by punching holes through said module at said predetermined portion of said wire, and embedding said module in a holder.

7. The method of claim 6 wherein said step of affixing comprises sealing said wires between first and second plies to form a laminate structure.

8. The method of claims 6 or 7 wherein said step of embedding comprises the steps of inserting said module into an opening of an intermediate ply holder material and thereafter laminating the front and rear ply of holder material to said intermediate ply to form said holder.

9. The method of claim 6 or 7 wherein said wires extend substantially across said module and the predetermined portions removed are inboard from each edge of the wire to provide a relatively physically stable encoded module.

* * * * *